May 2, 1961  T. C. NEHRBAS ET AL  2,982,860
PHOTOMULTIPLIER COMPENSATION SYSTEM
Filed May 28, 1958
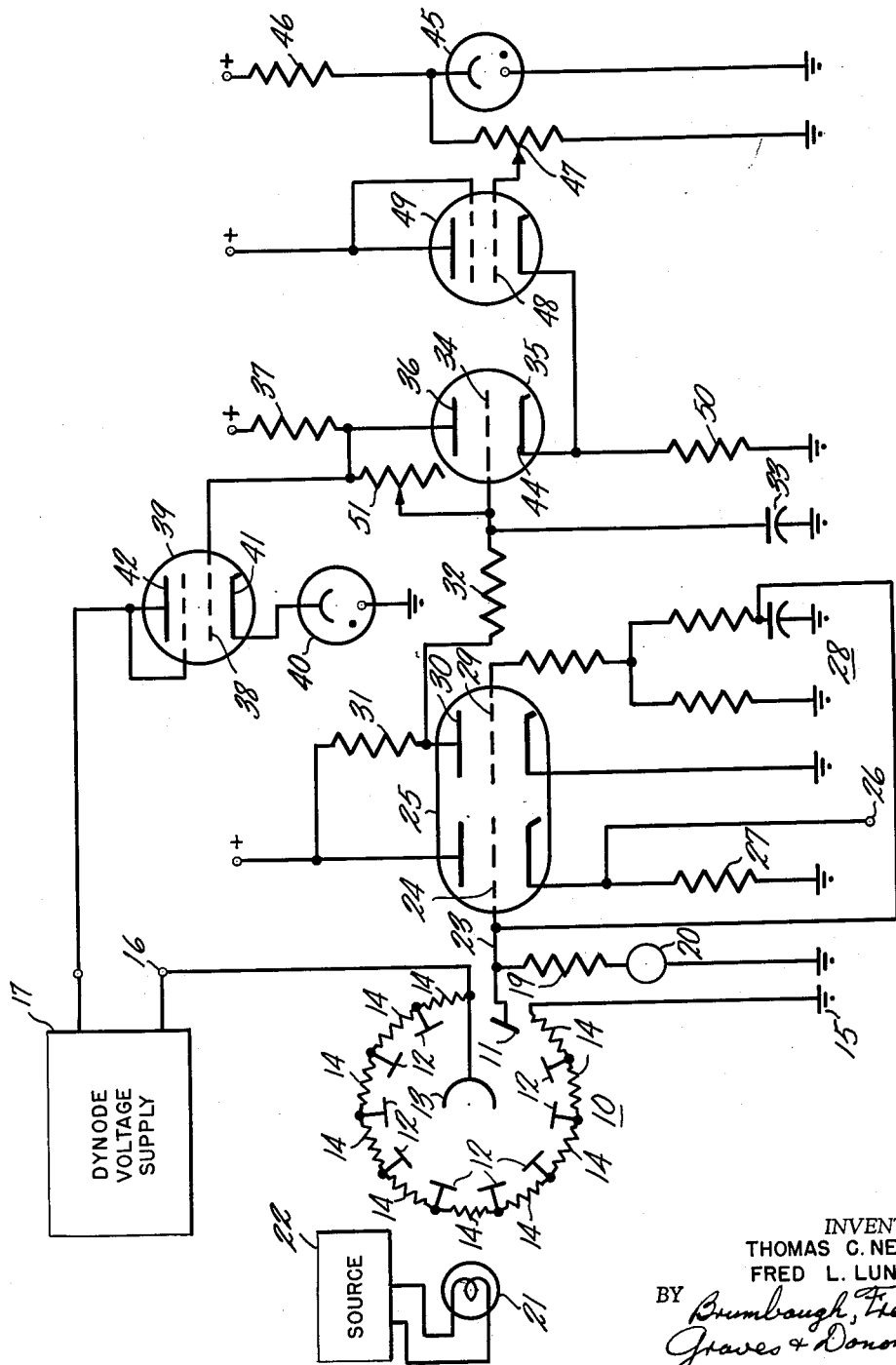
INVENTORS
THOMAS C. NEHRBAS
FRED L. LUNTZ
BY Brumbaugh, Free,
Graves & Donohue
their ATTORNEYS.

United States Patent Office 2,982,860
Patented May 2, 1961

2,982,860

PHOTOMULTIPLIER COMPENSATION SYSTEM

Thomas C. Nehrbas, Huntington, and Fred L. Luntz, Brooklyn, N.Y., assignors to Telephonics Corporation, Huntington, N.Y., a corporation of New York Filed May 28, 1958, Ser. No. 738,516

7 Claims. (Cl. 250—207)

The present invention relates to photomultiplier control systems, and, more particularly, to novel and improved compensating means to compensate for changes in the tube characteristics of photomultiplier tubes.

Photoelectric control systems employing photomultiplier tubes are extensively used in the control art. For example, in the field of yarn inspection, the yarn to be inspected is passed between a source of illumination and a photomultiplier tube. Variations in the output current of the photomultiplier tube are indicative of defects or variations in the nature of the yarn being inspected. However, when photoelectric systems of this type are being used to detect flaws or defects of relatively small magnitude, it is necessary to consider and compensate for any variations that may take place in the output current of the photomultiplier tube as the result of changes in the tube characteristics. The need for this compensation has been recognized and a variety of different compensating systems have been developed. In one type, compensating variations are produced in the source of illumination. In yet another type, the voltage supply for the photomultiplier tube is varied in order to compensate for the changes in tube characteristics.

In accordance with the invention, a novel and improved compensating system is provided for controlling the voltage supply of the photomultiplier tube by means of a feedback circuit unresponsive to the normal detection signal pulses having durations in the order of microseconds resulting from variations, defects or flaws in the tested article. In contrast to variations of that type, the variations in a tube's sensitivity, due to its inherent properties, have a comparatively long duration. Therefore, the variations which are to be compensated for are susceptible of selection by a selective network, such as a resistive-capacitive network having a long time constant, which will pass the compensating signal but rejects the normal operating pulse having the relatively shorter time period.

For a more complete understanding of the invention, reference may be had to the following detailed description taken in conjunction with the single figure of the drawing, which is an electrical schematic view of a photomultiplier compensating network, in accordance with the invention.

In the figure, there is shown a conventional photomultiplier tube 10, which may be of a type such as the RCA type 931–A photomultiplier tube, having an anode 11, a series of nine dynodes 12, and a cathode 13. The dynodes 12 and the cathode 13 are interconnected in a conventional manner by a voltage divider including a series network of resistances 14 between an electrical ground 15 and the negative terminal 16 of a conventional high voltage, D.C. voltage supply 17. The anode 11 is connected through an output resistance 19 and an ammeter 20 to electrical ground.

The photomultiplier tube 10 is responsive to illumination from a light source 21 energized by a suitable conventional voltage source 22, which if desired may be of variable magnitude.

The output of the photomultiplier tube 10 is taken at the anode 11 and fed by a conducting means 23 to a control grid 24 of an amplifying means including one-half of a single envelope, duo-triode amplifier tube 25 connected as a cathode follower with its output taken from a terminal 26 across a cathode resistance 27. The normal operating signal pulses of the photomultiplier tube appear at the terminal 26.

The output of the photomultiplier tube 10 is also fed from the anode 11 through the conducting means 23 and a resistive-capacitive coupling network 28 to a control grid 29 of a separate amplifying means including the second triode section of the duo-triode, single envelope amplifying tube 25 having an anode 30 and a load resistance 31. The output of the second half of the duo-triode 25 is fed through an integrating network including a series resistance 32 and a shunt capacitance 33, having a long time constant, to the control grid 34 of an amplifying means such as a triode amplifier 35. The output of the triode amplifier 35 is taken from an anode 36 thereof across a load resistance 37 and is fed to a control grid 38 of an amplifying means 39 in series relation with a voltage regulator tube 40, the dynode voltage supply 17 and the voltage divider including the resistances 14 for the cathode 13 and dynodes 12 of the photomultiplier tube 10. The tube may be a power amplifier tube such as a conventional 6V6, with its cathode 41 connected to ground through the voltage regulator tube 40, and its anode 42 connected to the positive terminal of the dynode voltage supply 17.

The cathode 44 of the tube 35 is maintained at a constant positive potential with respect to ground, by means of a regulating circuit including a conventional voltage regulator tube 45 connected through a load resistance 46 between ground and a positive voltage supply. The output voltage of the voltage regulator tube 45 is fed across a variable potentiometer 47, the top of which is connected to the control grid 48 of an amplifying means 49 connected in cathode follower relation between ground and a suitable positive voltage supply and having a common cathode resistance 50 with the cathode 44 of the tube 35. The gain of the tube 35 may be controlled by a variable rheostat 51 connected between the control grid 34 and the anode 36 of the tube 35.

Thus there is provided in accordance with the invention, a novel and improved compensating circuit for a photomultiplier tube employing a feedback operation in which compensating signals of relatively long duration are fed from the anode 11 of the photomultiplier tube 10 through an amplifying means and a selective integrating network having a long time constant to an amplifying means having a constant reference potential on its cathode to control the effective resistance of an amplifying means in series relation with the dynode voltage supply of the photomultiplier tube 10, which has a constant potential difference across its two output terminals.

When the photomultiplier tube current decreases, due to the inherent properties of the tube, a signal is sent through the feedback network causing the potential applied to the dynode voltage dividing network including the resistances 14 to increase, thereby causing the photomultiplier tube current to return to its normal value. On the other hand, if the photomultiplier tube current increases as the result of changes in the characteristic of the tube, the dynode potentials will be decreased causing the photomultiplier tube current to be restored to its normal operating value. The operation of this compensating system will in no ways affect the normal operating and detecting circuits of the device employing the photomultiplier tube.

It will be obvious to those skilled in the art, that the above described embodiment is meant to be merely exemplary and that it is susceptible of modification and variation without departing from the spirit and scope of the invention. Therefore, the invention is not deemed to be limited except as defined by the appended claims.

We claim:

1. A compensating system for a photomultiplier tube having an output electrode and a plurality of electrodes, the potential of which is controlled by a voltage dividing network in series relation with the output of a source of voltage between two potential reference points, the combination herewith comprising means connected to said output electrode for selecting output signals having at least a predetermined time duration, means having a variable effective resistance in said series relation with said voltage source and said voltage dividing network, and means responsive to said output signals having at least said predetermined time duration for controlling the effective resistance of said variable resistance means.

2. A compensating system for a photomultiplier tube having an output electrode and a plurality of electrodes, the potential of which is controlled by a voltage dividing network in series relation with the output of a source of voltage between two potential reference points, the combination therewith comprising means connected to said output electrode for selecting output signals having at least a predetermined time duration, means having a variable effective resistance in said series relation with said voltage source and said voltage dividing network, and means having a substantially constant reference level responsive to said output signals having at least said predetermined time duration for varying the effective resistance of said variable resistance means in response to differences in potential between said reference level and the potential of said selected output signals.

3. A compensating system for a photomultiplier tube having an output electrode and a plurality of electrodes, the potential of which is controlled by a voltage dividing network in series relation with the output of a source of voltage between two potential reference points, the combination therewith comprising selecting means including a resistive-capacitive network connected to said output electrode for selecting output signals having at least a predetermined time duration, means having a variable effective resistance in said series relation with said voltage source and said voltage dividing network, and means having a substantially constant reference level responsive to said output signals having at least said predetermined time duration for varying the effective resistance of said variable resistance means in response to differences in potential between said reference level and the potential of said selected output signals.

4. A compensating circuit for a photomultiplier tube having an output electrode and a plurality of electrodes, the potential of which is controlled by a voltage dividing network in series relation with the output of a source of voltage between two potential reference points, the combination therewith comprising means connected to said output electrode for selecting output signals having at least a predetermined time duration, means having a variable effective resistance in said series relation with said voltage source and said voltage dividing network, an amplifying means having a cathode and a control grid, said control grid being responsive to said output signals having at least said predetermined time duration, and means for maintaining said cathode at a substantially constant potential reference level, the output of said amplifying means controlling the effective resistance of said variable resistance means in response to differences in potential between said reference level potential and the potential of said selected output signals.

5. A compensating system for a photomultiplier tube having an output electrode and a plurality of electrodes, the potential of which is controlled by a voltage dividing network in series relation with the output of a source of voltage between two potential reference points, the combination therewith comprising means connected to said output electrode for selecting output signals having at least a predetermined time duration, means having a variable effective resistance between two points in said series relation with said voltage source and said voltage dividing network, one of said two points being coupled to said voltage source, the other of said two points being connected to a reference point at a substantially constant reference potential, and means having substantially constant reference potential responsive to said output signals having at least said predetermined time duration for varying the effective resistance of said variable resistance means in response to differences in potential between said reference potential and the potential of said selected output signals.

6. A compensating system for a photomultiplier tube having an output electrode and a plurality of electrodes, the potential of which is controlled by a voltage dividing network in a series circuit with the output of a source of voltage between two potential reference points, the combination therewith comprising means connected to said output electrode for selecting output signals having at least a predetermined time duration, means having a variable effective resistance connected in said series circuit with said voltage source and said voltage dividing network between said two potential reference points, and means having a substantially constant reference potential responsive to said output signals having at least said predetermined time duration for varying the effective resistance of said variable resistance means in response to differences in potential between said reference potential and the potential of said selected output signals.

7. A compensating system for a photomultiplier tube having an output electrode and a plurality of electrodes, the potential of which is controlled by a voltage dividing network in a series circuit with the output of a source of voltage between two potential reference points, the combination therewith comprising a resistive-capacitive selective network having a relatively long time constant, first amplifying means having a control grid and a cathode, means for coupling the output of said output electrode of said photomultiplier tube through said resistive-capacitive selective network to said control grid of said first amplifying means for supplying said selected output signals having at least a predetermined time duration thereto, means for maintaining the cathode of said first amplifying means at a constant reference potential, second amplifying means included in said series circuit between the one of said potential reference points having the higher potential value and said source of voltage, and means coupling the output of said first amplifying means to said second amplifying means to control the effective resistance of said second amplifying means in response to differences in potential between said reference potential on the cathode of said first amplifying means and the potential of said selected output signals fed to said control grid of said first amplifying means.

References Cited in the file of this patent

UNITED STATES PATENTS

| | | |
|---|---|---|
| 2,452,381 | Lindenhovius | Oct. 26, 1948 |
| 2,733,357 | Warren | Jan. 31, 1956 |
| 2,758,273 | Martin | Aug. 7, 1956 |
| 2,841,718 | Hoover | July 1, 1958 |
| 2,878,395 | Mindheim | Mar. 17, 1959 |